United States Patent
Ho et al.

(10) Patent No.: US 6,249,896 B1
(45) Date of Patent: Jun. 19, 2001

(54) ERROR-TOLERANT SYNC DETECTION FOR DVD OPTICAL DISKS USING PROGRAMMABLE SEQUENCE OF SYNC MARKS

(75) Inventors: Son Hong Ho, Los Altos; Hung Cao Nguyen, San Jose; Phuc Thanh Tran, Milpitas, all of CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/251,724

(22) Filed: Feb. 17, 1999

(51) Int. Cl.[7] .............................. G11B 27/00; G06F 11/00
(52) U.S. Cl. ........................................ 714/814; 714/798
(58) Field of Search ..................................... 714/814, 811, 714/798, 819; 375/359, 354, 355, 362, 363; 360/51, 50, 26

(56) References Cited

U.S. PATENT DOCUMENTS

| | | |
|---|---|---|
| 4,599,732 * | 7/1986 | LeFever ............................. 375/346 |
| 5,083,303 | 1/1992 | Yanagida et al. ..................... 369/48 |
| 5,351,231 | 9/1994 | King et al. ........................... 369/124 |
| 5,353,175 | 10/1994 | Chiba .................................. 360/51 |
| 5,563,854 | 10/1996 | Kobunaya et al. .................... 369/32 |
| 5,737,371 | 4/1998 | Jaquette .............................. 375/357 |
| 6,009,549 * | 12/1999 | Bliss et al. .......................... 714/769 |
| 6,124,994 * | 9/2000 | Malone, Sr. ........................... 360/48 |

OTHER PUBLICATIONS

"DVD Demystified", Jim Taylor, McGraw–Hill, 1998, pp. 120–136.

* cited by examiner

Primary Examiner—Christine Tu

(57) ABSTRACT

Synchronization (sync) marks on a digital-versatile disk (DVD) optical disk are initially detected and later used to adjust bit timing after jitter has occurred. Each DVD physical sector contains many sync marks in a predefined sequence. Each sync mark has a sync-code field that varies for the sync marks in a sector, and a fixed sync pattern that is constant for all sync marks. The first sync mark is detected at initialization by detecting a previous sequence of sync codes of sync marks that precede the first sync mark. The sequence is programmable so that one to seven sync marks are in the sequence searched for. Detection for sync marks with bit errors can still occur since a programmable number of bit errors are allowed in each sync code and in the fixed sync pattern. One of the sync codes can be missed in the sequence and detection still made, allowing tolerance of errors in the sync marks when longer sequences of sync codes are matched. Once initial sync is made, the bit timing is adjusted when too many pseudo-sync clocks are inserted for sync marks missed due to jitter. An early and a late window around the expected sync point are used to enable re-sync to a detected fixed sync pattern.

20 Claims, 7 Drawing Sheets

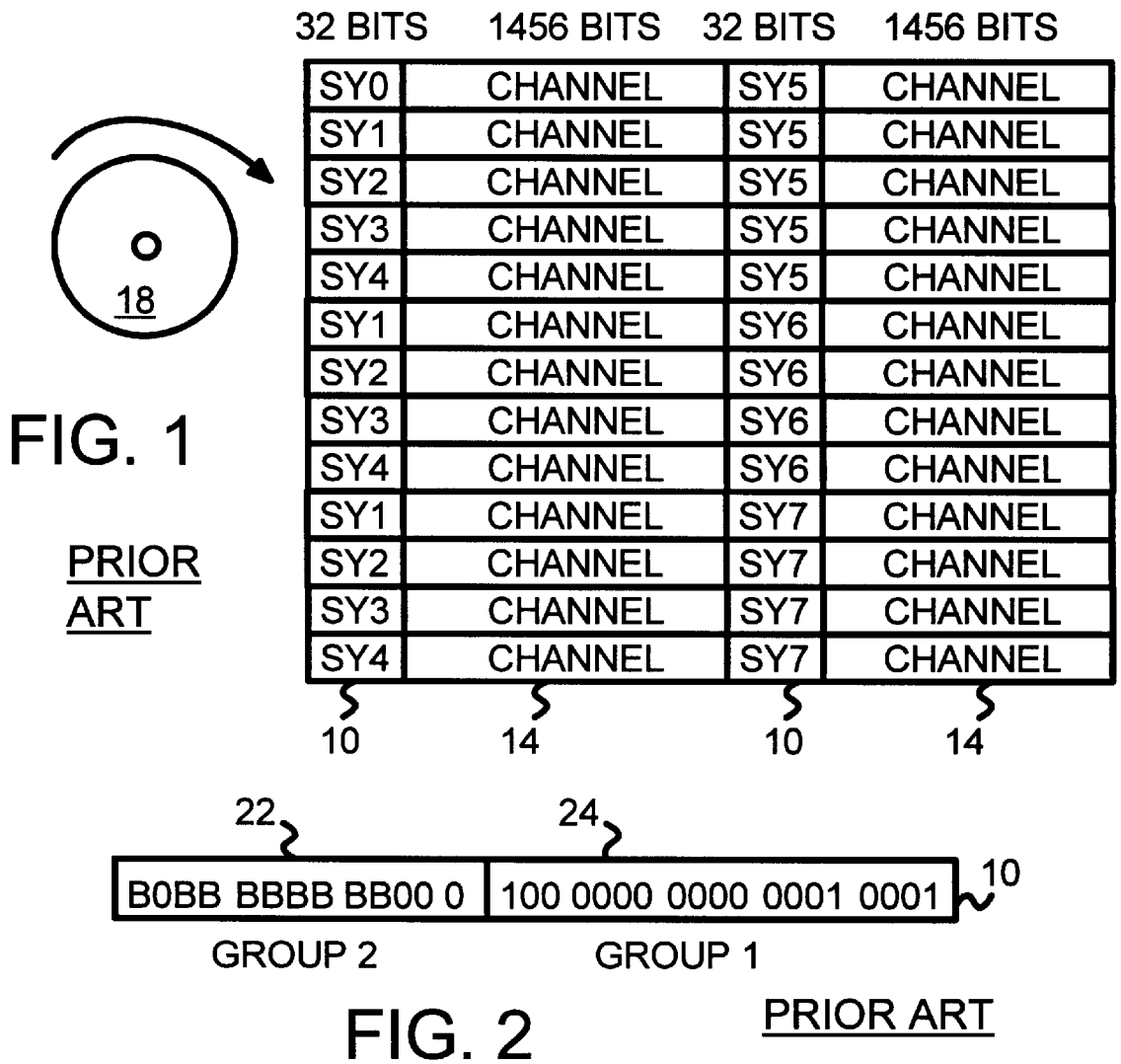

| SY3 | SY7 | SY4 | SY7 | SY0 ↓ |

FIG. 4A

SY CODE FOUND

| SY3 | SY7 | XXX | SY7 | SY0 ↓ |

FIG. 4B

SY CODE FOUND

| SY3 | SY7 | SY4 | SY7 | XXX ↓ |

FIG. 4C

SY CODE FOUND

| SY PATTERN 26 |
| MISMATCHED 28 SY ALLOWED | (0:1) |
| MAX PSEUDO SYNCS 30 | (0:15) |
| BIT SY GP2 MISMATCH 46 | (10:13) |
| BIT SY GP1 MISMATCH 48 | (16:19) |

| SY CNT TO RE-SYNC 50 | (0:7) |
| EARLY WIN 52 | (0,8,16,32) |
| LATE WIN 54 | (0,8,16) |

FIG. 5

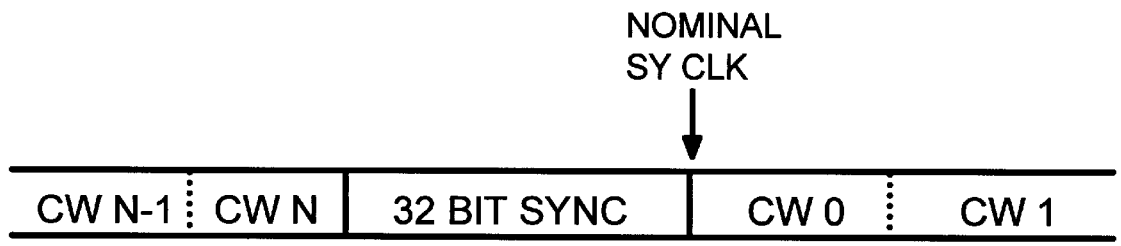
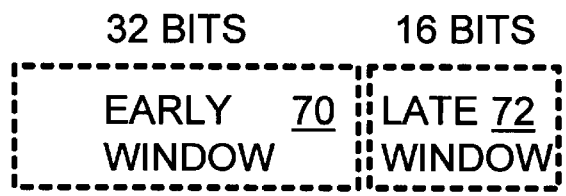
FIG. 9A
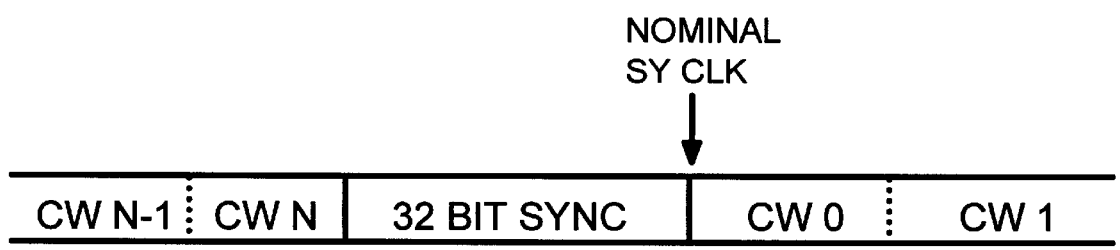
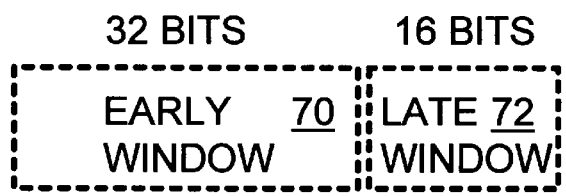
FIG. 9B
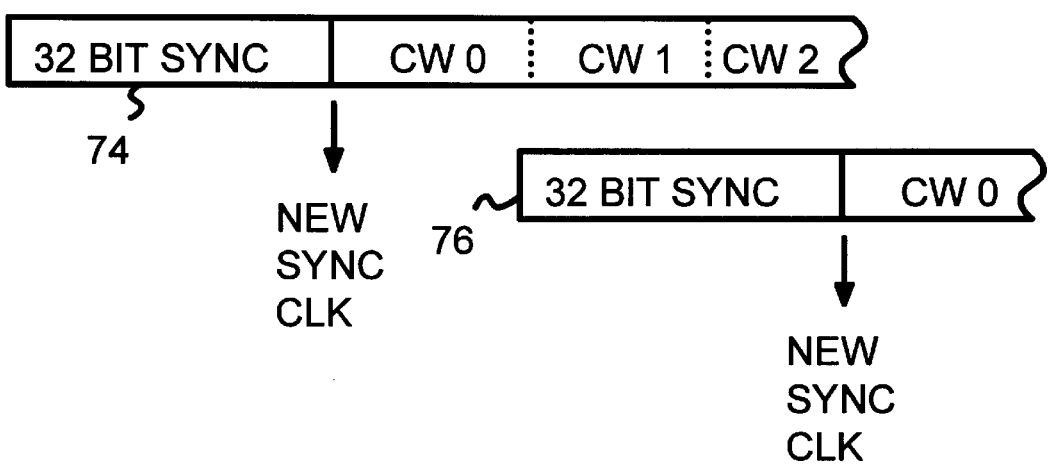

ERROR-TOLERANT SYNC DETECTION FOR DVD OPTICAL DISKS USING PROGRAMMABLE SEQUENCE OF SYNC MARKS

FIELD OF THE INVENTION

This invention relates to optical-disk systems, and more particularly to detection of sector synch patterns for DVD.

BACKGROUND OF THE INVENTION

Optical disks are widely used in both computer and consumer electronics fields. Compact Disks (CD) were originally produced for storage of audio recordings and later adapted for use on personal computers (PCs) as CD-ROMs. Optical disks are inexpensive to produce and durable. More recently, a next-generation standard for optical disks known as digital-versatile disk (DVD) has emerged. DVD has mush higher data density and bandwidth than CD. Optical disks use a laser beam that is deflected by small pits arranged in a continuous spiral on the disk's surface. The presence or absence of the pits as the disk spins over the laser beam is detected as binary data.

Increasing data bandwidth requirements of PCs has driven development of the higher-speed DVD-ROM readers or drives. Limitations of the technology such as a fixed wavelength of the laser and wobble of the disk as it spins cause data errors at the higher speeds. While the physical data on the disk may be correct, the higher rotational and reading speeds may introduce errors such as jitter. These higher-speed DVD-ROM drives may need to slow down and re-read data sectors when errors are encountered. Re-reading the data defeats the benefits of higher-speed drives.

Markers known as sync marks are added for data synchronization. These sync marks can be detected and used to align the data at the beginning of each physical sector on the disk. Jitter can thus be compensated for, and read integrity improved.

FIG. 1 shows a physical sector with sync marks being read from a DVD optical disk. As is apparent from FIG. 1, DVD sectors are more complex that sectors for CD-ROM. Data stored on a DVD disk is arranged into physical sectors that include sync marks 10. A physical sector has 13 rows, each with two channels of 1456 bits that are each preceded by a sync mark. The 1456 bits are read as ninety-one 16-bit modulated codewords that are later converted by 8/16 demodulation to 91 data bytes (symbols). Each row has two sets of 1456 bits of channel data 14 and two 32-bit sync marks 10. Data read from DVD disk 18 are arranged into physical sectors for error correction.

The sync marks within a physical sector are not identical. Rather, the sync marks follow a definite arrangement within each physical sector. The physical sector begins with a SY0 sync mark. After the first 1456-bits of channel data, the second sync mark SY5 is found midway through the first row. Then after the next channel data, the second row begins with a SY1 sync mark, with another SY5 sync mark midway through the second row. The third row contains SY2 and SY5 sync marks, while the fourth row contains SY3 and SY5 sync marks. The first five rows begin with SY0, SY1, SY2, SY3, and SY4 sync marks. The next four rows begin with SY1, SY2, SY3, and SY4 sync marks, and sync marks SY1, SY2, SY3, and SY4 are repeated a third time for the last four rows. The mid-row sync marks are SY5 for the first five rows, SY6 for the next four rows, and SY7 for the last four rows. Any row in the physical sector can be identified by its two sync marks, since no two rows have the same pair of sync marks. The zero sync mark SY0 occurs only once, at the beginning of the first row of the physical sector. All physical sectors on the DVD disk have this sequence of sync marks.

The DVD data was modulated to minimized voltage excursions that can reduce precision of small-signal circuits in the read channel circuitry. Before data bytes are written to the DVD disk, a modulator expands each byte to a 16-bit codeword by minimizing a running digital-sum value (DSV) that is increased for each one bit and decreased for each zero. The codewords are (2,10) run-length-limited (RLL) codes that have a minimum run of two zeros and a maximum run of ten zeros.

FIG. 2 shows a DVD sync mark. Sync mark 10 is a 32-bit string of bits that are divided into two groups 22, 24. Group 1 (24) is a special sequence of bits that does not occur in the channel data bits. It is a violation of the (2,10) RLL code, since it contains a run of 13 zeros. The sequence of group 1 is identical for each sync mark.

Group 2 (22) occurs first in sync mark 10. Group 2 varies with the eight different sync marks SY0 to SY7. The B bits can be one or zero, depending on the 0:7 sync code. These B bits are also modified for modulation to alter the number of one bits as needed by the modulator. For example, for sync code 0, any of the following group 2 codes can be written to the disk as the SY0 code:

0001 0010 0100 0
0001 0010 0000 0
1001 0010 0000 0
1001 0010 0100 0

These codes contain from two to four one bits, allowing the modulator to adjust the DSV by its choice of sync code. All are detected as SY0.

At higher speeds, soft errors may occur as the data is being read. Error correction is provided for the channel data, but errors in the sync marks could cause the desired data to be missed, requiring that a re-read occur, delaying the data. Sync marks must be quickly detected as the data arrives from the spinning disk, so that buffering can begin at the correct location. For example, the SY0 sync mark at the beginning of the physical sector could be searched for, but if an error occurred while reading the SY0 mark, the sector could be missed.

When a sync mark is missed, a pseudo-sync mark can be inserted into the data stream by a bit counter. Timing windows have been used to re-synchronize data streams when jitter occurs. See U.S. Pat. No. 5,351,231 by King et al., assigned to Cirrus Logic, Inc., and U.S. Pat. No. 5,353,175 by Chiba, assigned to Sony Corp.

What is desired is a sync detector for DVD. It is desired to detect the start of a physical sector when errors are present in the sync marks. An error-tolerant sync detector is desirable. It is further desired to adjust the sync timing for jitter that occurs as the data as is read from the disk. A sync jitter-adjuster that interfaces smoothly with the demodulator is desirable.

SUMMARY OF THE INVENTION

An error-tolerant sync-sequence detector has a bit-stream input from an optical disk. A sync-code detector is coupled to the bit-stream input. It detects a variable sync code and decodes a sync number from the variable sync code. The sync number varies for different sync codes within a physical sector of the optical disk.

A fixed-pattern detector is coupled to the bit-stream input. It detects a fixed sync pattern. The fixed sync pattern is a same pattern of bits for all sync marks in the physical sector. A sync-code sequencer is coupled to receive the sync number from the sync-code detector when the fixed-pattern detector detects the fixed sync pattern. The sync-code sequencer compares a sequence of sync numbers received from the sync-code detector to a predetermined sequence of sync-code numbers. The sync-code sequencer signals an initial sync when the sequence of sync numbers received matches the predetermined sequence of sync code numbers. Thus the initial sync is generated by matching the predetermined sequence of sync-code numbers. The variable sync codes vary for different sync codes within the physical sector.

In further aspects of the invention a sync-code sequence register is coupled to the sync-code sequencer. It stores an identifier to indicate the predetermined sequence of sync-code numbers. The predetermined sequence of sync-code numbers matched by the sync-code sequencer is programmable.

In still further aspects a sync-code threshold register is coupled to the sync-code sequencer. It stores a threshold number of mismatched sync codes allowed. The sync-code sequencer generates the initial sync when the sequence of sync-numbers received matches the predetermined sequence of sync-code numbers except for an allowed number of sync-code numbers with errors in the sequence of sync numbers received when the allowed number does not exceed the threshold number. Thus a threshold number of sync codes with errors are allowed when the initial sync is generated.

BRIEF DESCRIPTION OF THE DRAWINGS

FIG. 1 shows a physical sector with sync marks being read from a DVD optical disk.

FIG. 2 shows a DVD sync mark.

FIG. 3 highlights a programmable sequence of sync marks.

FIGS. 4A–C illustrate a sequence of sync codes that can be detected even when errors occur in the sync marks.

FIG. 5 highlights programmable registers for sync detection and tracking.

FIG. 9A shows early and late windows for sync-mark detection when sync timing is adjusted because jitter has shifted the bit timing.

FIG. 9B shows early and late frames detected using early and late re-sync windows.

DETAILED DESCRIPTION

Figure 6:
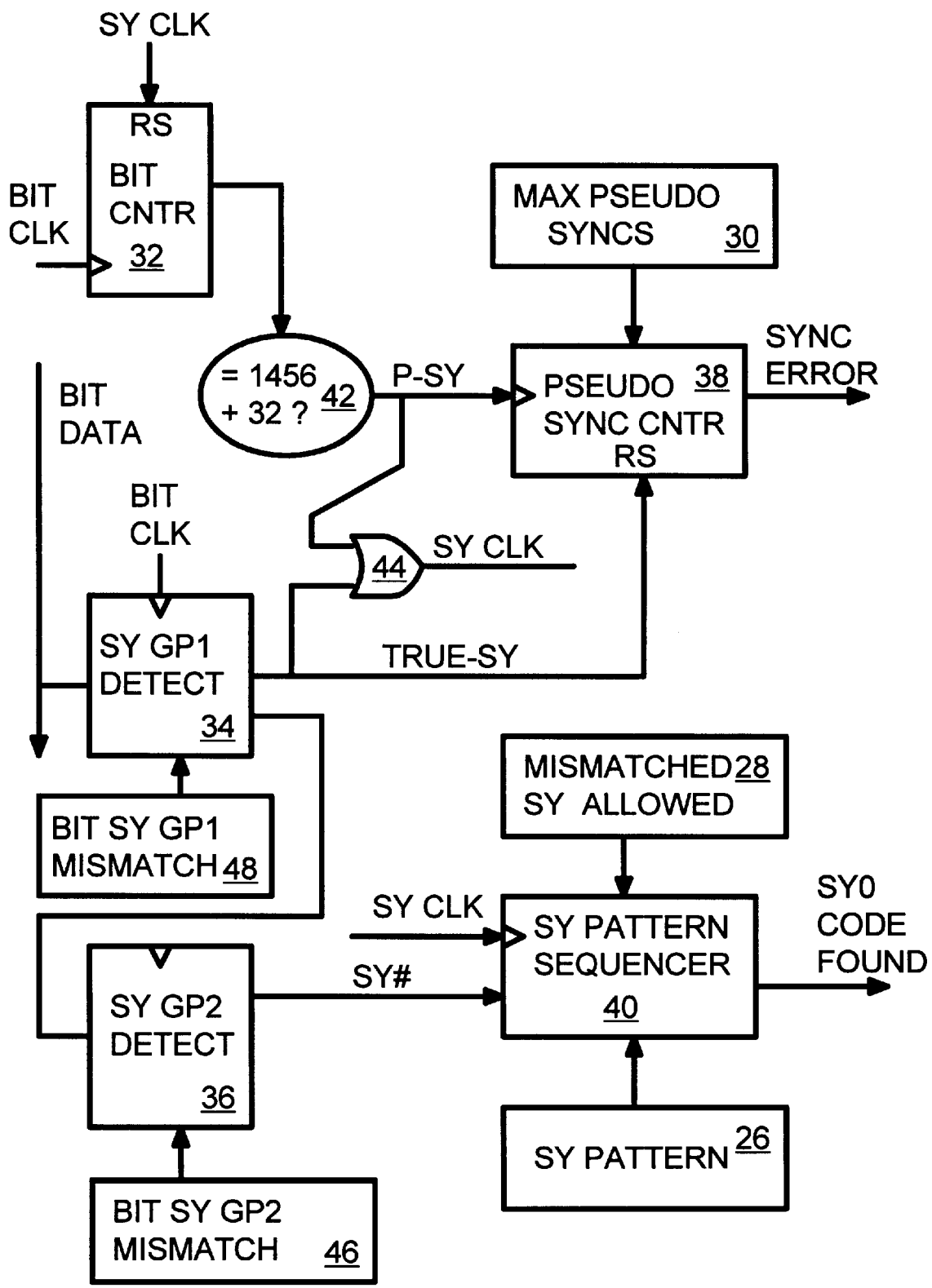
FIG. 6 is a block diagram of a circuit that matches a sequence of sync codes for initially detecting the SY0 sync mark.

The present invention relates to an improvement in DVD-disk sync detection. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Sector synchronization can be divided into two steps:
1. initial sync search, detecting sync marks and sync codes, and
2. sync tracking, re-synchronizing as jitters occur.

The SY0 sync mark at the beginning of the physical sector needs to be detected, regardless of high-speed read errors that may wipe out even the SY0 mark itself. The inventor has realized that programmability can be added to sync detection to improve reliability while allowing for read errors. With the invention, entire sync marks can be missed if the rest of a programmable sequence is found, allowing for reliable sync detection.

Programmable windows can be used for detection the sync mark once initial detection has been made. Errors outside the windows that appear to be sync marks are screened out. The width of the programmable windows is preferably a multiple of the modulation width for easy interfacing with the demodulator.

Programmable Sequence of Sync Marks—FIG. 3

FIG. 3 highlights a programmable sequence of sync marks. Sync-pattern register 26 has a three-bit field that specifies a sequence of sync codes that must be matched to detect the start of a physical sector. The programmable sequence is searched for initially when no other reference is available. Once a physical sector is detected and synced to, other methods are used to maintain sync and adjust for jitter.

When sync-pattern register 26 is cleared to 000, only the first sync pattern in the first row, SY0, is searched for. When the SY0 sync code in group 2 of the sync mark, and the standard sync mark of group 1 are found, the sync found status is set.

When sync-pattern register 26 is set to 001, the DVD disk controller searches for sync code SY7, then on the next sync mark looks for sync code SY0. The pattern SY7 followed by SY0 must be found. This is more reliable than just searching for SY0, since a read error could make another sync mark appear to be SY0. For example, if rows 2 and 3 of the sector of FIG. 1 are being read, the sync patterns SY1, SY5, SY2 are normally read. If the SY2 sync pattern has a read error that makes it appear as SY0, then the SY0 sync is incorrectly detected when sync-pattern register 26 is set to 000. However, when sync-pattern register 26 is set to 001, the error does not trigger a sync detect, since SY1,SY5, SY0 does not match the sequence SY7, SY0.

When sync-pattern register 26 is set to 010, the DVD disk controller searches for a three-code sequence of sync codes SY4, SY7, then SY0. This sequence normally occurs as the last row of one sector and the first row of another sector are read. As higher binary values are programmed into sync-pattern register 26, longer sequences of sync codes must be matched to generate a sync detection. For example, programming 111 into sync-pattern register 26 requires an 8-code sequence: SY7, SY2, SY7, SY3, SY7, SY4, SY7, and finally SY0. The seven sync marks before SY0 in the last four rows of the previous sector must read correctly before the SY0 mark can be detected.

As higher binary values are programmed into sync-pattern register 26, longer sequences must be matched for sync detection, improving reliability. However, any error in any of preceding sync marks can block sync detection, causing more sync failures. This can slow down performance when sync detection must be repeated after an error.

Programmable Threshold of Sync-Code Errors—FIGS. 4A–C

The inventor has realized that performance can be improved when some errors in the sync codes are allowed, especially for the longer sequences. A sync-mismatch threshold register is used to allow a certain number of errors in the sync marks during initial detection. For example, one error can be allowed in any of the sync marks in the sequence, allowing one of the sync marks to be mis-read and detection to still occur. This is useful especially for longer sequences, since it allows for some errors, while still increasing the number of sync marks compared for detection. Shorter sequences may not allow any errors.

FIGS. 4A–C illustrate a sequence of sync codes that can be detected even when errors occur in the sync marks. In FIG. 4A, sync-pattern register 26 (FIG. 3) has been set to 100, requiring a five-code sequence for detection: SY3, SY7, SY4, SY7, and finally SY0. When all sync codes are good, the sync-code found flag is set after the final SY0 code is found. The DVD controller then synchronizes itself to the beginning of the physical sector marked by SY0.

In FIG. 4B, an error occurs while reading sync SY4, the first sync mark in the last row of the previous sector. This can be a hard error on the disk itself, or a soft error caused by high-speed reading. When the sync-mismatch threshold register is set to allow one error, detection of SY0 is still made, since four of the five sync codes are still detected: SY3, SY7, SY7, and SY0.

In FIG. 4C, an error occurs while reading sync SY0, the first sync mark in the first row of the sector. The SY0 sync mark is critical, since it is unique to the first row of the sector. All other sync marks are repeated multiple times in the sector. However, even an error in this critical SY0 mark can occur and detection still made. With the sync-mismatch threshold register is set to allow one error, detection of SY0 is made, since four of the five sync codes are still detected: SY3, SY7, SY4, and SY7. A bit counter counts channel and sync-mark bits since the SY7 code's mark and then inserts a dummy or pseudo sync where SY0 should be.

Programmable Registers—FIG. 5

FIG. 5 highlights programmable registers for sync detection and tracking. Several registers provide programmable control over detection of the initial sync mark. Sync-pattern register 26 specifies the number of sync codes to match in the sequence before the initial sync code SY0. Sync-mismatch threshold register 28 specifies the number of sync codes that can mismatch in the sequence of register 26. Zero or one mismatch can be programmed into register 28.

Other registers are used for adjusting the synchronization to adapt to jitter. Maximum pseudo-sync register 30 is programmed with the maximum number of pseudo sync clocks that can be inserted in the data stream until an actual sync mark is detected. When the sync mark is missed, a pseudo sync mark is generated at the expected location. However, if too many sync marks are missed, it is likely that too much jitter has occurred, and the firmware needs to re-initialize the sector sync. Zero to 15 pseudo sync marks can be allowed by programming register 30.

Bit-sync mismatch threshold registers 46, 48, specify the maximum number of bits in a sync mark that can mismatch and the sync still be detected. Two registers are provided, one for the fixed group 1 field and another for the group 2 field with the variable sync code of the sync mark. For the fixed group 2 field of the sync mark, up to 3 of the 13 bits can mismatch, depending on the value programmed into register 46, while the sync code field, group 1, can also have up to 3 of its 19 bits mismatch.

Similar to register 30, sync-count-to re-sync register 50 specifies the number of missed sync marks until the synchronization is adjusted. A smaller value is programmed into register 50 than register 30, so that successful sync adjustments do not trigger a sync error to the firmware controlling the DVD controller. A sync count of zero to seven can be programmed into register 50, while up to 15 missed marks can be programmed into register 30 before an error is signaled. Once the threshold in register 50 is reached, the DVD controller can make several attempts at adjusting the sync timing before the error is signaled by the error threshold in register 30.

Adjustment of the bit stream synchronization, which is triggered when the number of missed sync marks reaches the threshold from register 50, uses windows around the expected sync mark. An early window looks for the sync mark before the expected point, while a late window looks for the sync after the expected point. Early-window size register 52 specifies how many bits ahead the DVD controller looks for the sync mark, while late-window register 54 specifies the number of bits after the expected sync the controller looks for the sync mark. Multiples of 8 bits can be programmed in, although matching multiples of the 16-bit modulation codeword is preferred.

While it is possible to always look for the sync mark, registers 46, 48 allow bit mismatches to occur in a detected sync mark. Data in the channel could be similar enough to the sync marks that ignoring a few bits may produce a sync match. Windows block out most of the channel data, preventing this kind of false detect when bit mismatches are allowed.

Initial Sync Pattern Matching—FIG. 6

FIG. 6 is a block diagram of a circuit that matches a sequence of sync codes for initially detecting the SY0 sync mark. The data is separated from the clock by the read channel circuitry of the DVD disk reader, producing a data bit stream and a bit clock that is puled for each data bit. The fixed group 1 pattern of the sync mark contains a RLL(2,10) violation—a string of 13 zeros—that never occurs elsewhere in the channel data. The data bit stream is fed to sync group-1 detector 34, which is clocked by the bit clock. Each new bit is shifted into a 19-stage shift register on each bit clock, and 13 of the stages OR'ed together to see if all are zeros. The other 6 bits of the pattern are also checked to determine when the shift register hold s the sync pattern 100 0000 0000 0001 0001. When all stages match the pattern, the unique sync pattern has been found. The true-sync signal TRUE-SY is generated by detector 34. OR gate 44 then generates the sync clock SY_CLK.

Since only group 1 was compared, detector 34 generated the sync clock for all sync marks SY0 to SY7. The group-2 patterns must also be compared to determine which sync mark is the SY0 mark at the beginning of a new sector. Sync group-2 detector 36 likewise clocks bits into a shift register on each bit clock. The bits are shifted in from the last state of group-2 sync detector 34 so that the bits are delayed by 19 bit clocks. This provides the proper delay so that the group-2 sync code can be decoded and latched in to sync pattern sequencer 40 when the last bit of the group-1 sync code is received, triggering the sync clock.

The 13 stages of its shift register are decoded to determine which (if any) of the eight sync codes SY0 to SY7 the bits represent. The sync code number is sent from detector 36 to sync pattern sequencer 40, but only latched in on the sync clock. Thus only the correct group-1 sync bits are decoded and latched.

Bit-sync mismatch threshold registers 46, 48, specify the maximum number of bits in a sync mark that can mismatch and the sync still be detected. Bit-sync group-1 mismatch threshold register 48 allows sync group-1 detector 34 to mis-match a limited number of the sync-pattern bits, while bit-sync group-2 mismatch threshold register 46 allows sync group-2 detector 34 to mis-match a limited number of the sync-code bits. Thus a limited number of bits can have errors in either the group-1 or group-2 fields and yet the sync still be detected. Sync pattern sequencer 40 is a state machine that follows the sync codes latched in from detector 36 and compares them to the sequence programmed into sync-pattern register 26. For example, when sync-pattern register 26 is programmed for SY4, SY7, SY0, sync pattern sequencer 40 waits for SY4, then if the next sync code is not SY7, it resets, waiting again for SY4. When SY7 is next found, then the following pattern must be SY0; otherwise sync pattern sequencer 40 resets. When any three sequential codes are SY4, SY7, SY0, then when the final SY0 is latched, sync pattern sequencer 40 signals the SY0 code was found.

When code mismatches are allowed by sync-mismatch threshold register 28, sync pattern sequencer 40 allows one code to be skipped. A mismatch counter can be decremented as each mis-matched sync code is received until either the final SY0 code is received, and the SY0 code-found signal generated, or the mismatch counter reaches zero, resetting sync pattern sequencer 40.

When the group-2 sync pattern is not found, a dummy or pseudo-sync mark can be inserted, generating a SY_CLK. Bit counter 32 is reset by the sync clock SY_CLK, and is incremented by the bit clock. Once the 1456 channel bits and 32 sync bits have been counted, the next sync mark should be detected by detector 34. When the true sync mark is not detected, comparator 42 generates a pseudo-sync clock P-SY, which pulses the sync clock SY_CLK through OR gate 44. An S-R latch or other device may be used to prevent a late sync detection from detector 34 from generating a second sync clock pulse, or detector 34 can be disabled for a few clock periods or reset with each SY_CLK.

Too many pseudo syncs can indicate that the sync has failed and that the channel data is probably full of errors. Pseudo-sync counter 38 counts each pseudo-sync clock and signals a sync error when the error limit from maximum pseudo-sync register 30 is reached. Pseudo-sync counter 38 is reset by each true sync detected by detector 34.

Figure 7:
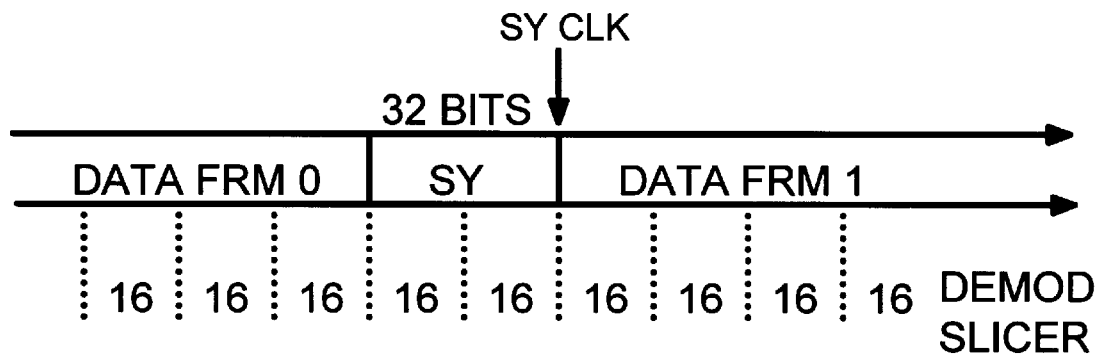
FIG. 7 highlights that the data stream is sliced into 16-bit codewords for demodulation.

Demodulation Slices Data-Stream into 16-bit Slices—FIG. 7

FIG. 7 highlights that the data stream is sliced into 16-bit codewords for demodulation. The data is stored on the DVD optical disk as 16-bit codewords that use a RLL(2,10) code. The channel data from frame 0 before the sync mark is sliced into 16-bit codewords that are then demodulated into 8-bit symbols. Since the sync pattern is 32 bits, it is exactly 2 codewords in length. The sync mark is generated at the end of the sync mark, when the first codeword of the next frame begins.

The codewords must be exactly lined up with the sync mark. If the sync is off by one bit, then all codewords will be off by one bit, and many errors occur.

Figure 8:
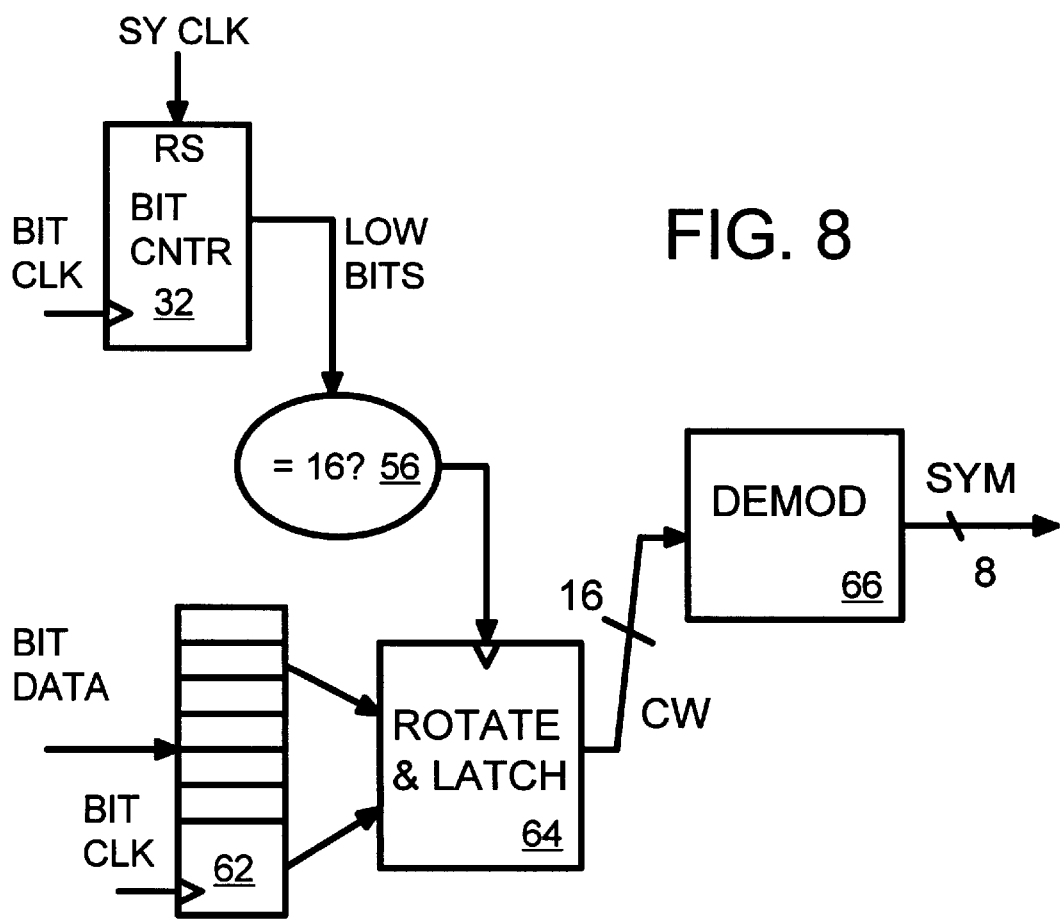
FIG. 8 is a diagram of a bit-stream slicer for an 8/16 demodulator.

FIG. 8 is a diagram of a bit-stream slicer for an 8/16 demodulator. Shift register 62 latches in each bit of data in response to the bit clock. A pointer-based FIFO rather than a shift register that shifts all data over on each clock can be used as a substitute. Bit clocks are counted by bit counter 32, and the low-order four bits are sent to comparator 56. Each time these low-order bits roll over to 16, comparator 56 generates a pulse to rotator and latch 64. Rotator and latch 64 rotates or multiplexes the 16 data bits stored in shift register 62 into the bitstream order and stores them for the next 16 bit-clock periods. Serial-to-parallel conversion is thus performed. The 16-bit word latched by rotator and latch 64 is sent to demodulator 66, which converts the 16-bit codeword to an 8-bit symbol byte. The symbol is sent to a buffer for error correction and is later sent to the host as the user data.

Sync-Tracking Windows—FIGS. 9A–B

The inventor has realized that sync tracking can use the 16-bit modulation slices of the data stream as windows to look for the sync mark that has moved due to jitter. Since bit errors in the sync mark can be masked off using bit-sync group-2 mismatch threshold register 46 (FIG. 5), valid channel data codewords could appear to be the sync mark. A window is used to block out most of the channel data codewords from the sync detector, thus preventing these false sync detections.

FIG. 9A shows early and late windows for sync-mark detection when sync timing is adjusted because jitter has shifted the bit timing. The nominal sync clock is generated at the end of the group-2 sync mark, at the end of the 32-bit sync pattern. When jitter occurs, bit clocks can be added or dropped, causing the data stream to be out of alignment. The sync pattern may shift so that it is not detected in the expected location, and a pseudo-sync clock inserted. When a predetermined number of pseudo-sync clocks have been inserted, the mis-alignment has lasted long enough that re-alignment is desirable to avoid further data loss.

It is likely that the sync clock is not off by many bits, so the actual sync mark is likely is near the expected location. The data stream immediately before the nominal, expected sync clock is examined using early window 70. Since early window 70 is 32 bits in size, if the sync mark is detected as many as 32 bits early, the bit timing can be adjusted. The data stream immediately after the expected sync point is also examined using late window 72. Late window 72 is 16 bits in size, so the actual sync can occur up to 16 bits late.

Early window 70 is 32 bits in size, the same size as the 32-bit sync field. This is also two codewords in length. Late window 72 is smaller, being only 16 bits in width, the same size as a channel codeword. Late window 72 overlaps exactly with the first codeword CW0 in the next frame. Since it is possible that additional jitter has re-adjusted the bit timing back to the nominal timing, the actual sync mark could be detected at the nominal point, so early window 70 includes the last bit of the sync pattern, where the nominal sync point is.

In FIG. 9B, early and late frames are detected using early and late re-sync windows. Early frame 74 occurs when jitter has occurred that speeds up the bit rate, such as when the DVD disk spins somewhat faster for a period of time. The sync field has advanced by 31 bits so that the sync pattern occurs where the last two codewords of the previous frame are expected. The sync detector continuously stores data bits, but a sync-pattern match is not recognized until the start of early window 70. The bit counter is reset early to adjust the timing for the early sync mark, thus moving the nominal sync over to match the actual sync mark NEW SYNC CLK detected in early window 70. Data extraction to the demodulator then begins immediately since the next frame's codewords follow the sync mark. A re-sync occurs without disruption to the data extraction and demodulation process.

The sync pattern is detected once the last bit in the pattern has been latched in, when the entire pattern of bits can be compared to the expected group-2 sync pattern. Thus detection is signaled at the end of the 32-bit sync pattern of early frame 74. This last bit overlaps the first bit of early window 70, so the sync detection is enabled. This is the earliest sync mark that can be detected with 32-bit early window 70. If the disk had accelerated more, early frame 74 would have its sync mark before early window 70 and would not be detected. An initial sync SY0 search as explained before is then necessary.

Late frame 76 is another example where the bit rate has slowed down, perhaps as the DVD disk slows its rotational speed. Even though the sync pattern overlaps the expected location of the sync pattern, the last bit of the group-2 sync mark has not yet been received when the pseudo sync clock is generated at the nominal sync location. Sync detection continues while late window 72 is open, for 16 bits after the nominal sync point. This is where the first 16-bit codeword is expected. The last bit of the 32-bit sync pattern of late frame 76 is decoded at the end of late window 72. Since the actual sync is decoded just as late window 72 ends, the sync mark is detected. The bit timing is adjusted for the later sync mark by moving the nominal sync over to match the actual sync mark NEW SYNC CLK detected in late window 72.

Should late frame 76 be delayed further, the last bit of the sync mark arrives after late window 72, during the second codeword CW1. Then the late sync is not detected because sync detection is disabled after the end of late window 72.

The sizes of early and late windows 70, 72 are selected to be equal to the following codeword for the late window, and the sync pattern for the early window. This simplifies processing. The windows can be reduced in size by the firmware programming different values into early-window register 52 and late-window register 54. These reduced sizes can be useful to avoid forcing detection in the data field. Early window 70 can be reduced to 16 or 8 bits in size, or can be disabled altogether. Late window 72 can be reduced from 16 bits to 8 bits, or can also be disabled. Disabling one of the windows but not the other allows only early or late sync marks to be detected.

Figure 10:
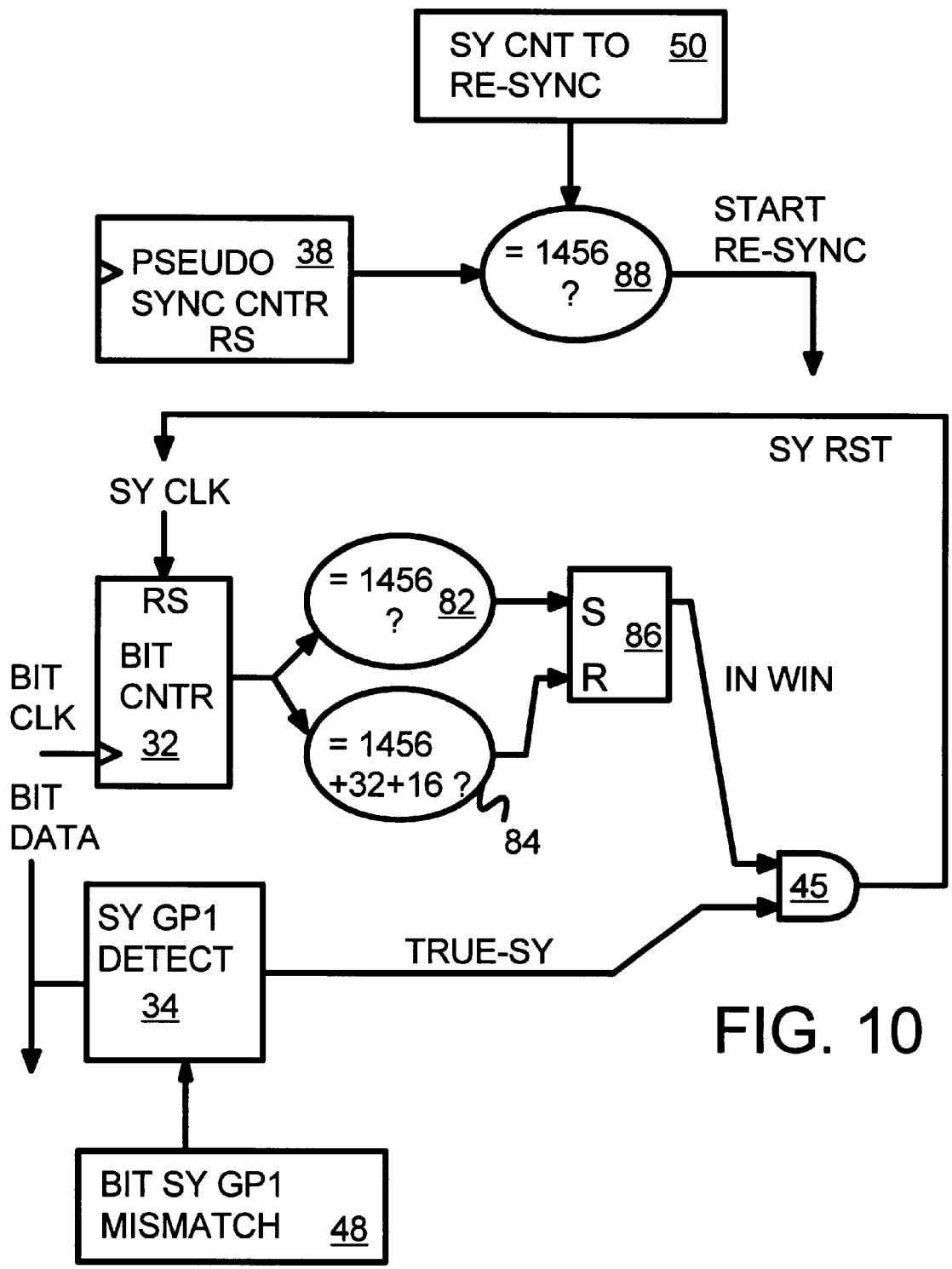
FIG. 10 is a diagram of a re-synchronization circuit that uses early and late detection windows.

Re-Sync Logic Using Early and Late Windows—FIG. 10

FIG. 10 is a diagram of a re-synchronization circuit that uses early and late detection windows. When several sync marks are missed, one after another, pseudo-sync counter 38 increments until the pseudo-sync count reaches the re-sync threshold from register 50. Then comparator 88 signals a start of re-sync, activating the rest of the circuitry of FIG. 10.

The bit stream is fed into sync group-1 detector 34, which stores the bits in response to the bit clock and attempts to match them with the fixed group-1 sync pattern with the string of zeros. Group-1 sync-pattern register 48 specifies the number of bits that can mismatch the pattern and the sync pattern still be detected. A true sync clock is generated by detector 34 when enough bits match.

Bit counter 32 increments for each bit clock in the data channel and the sync mark. Counter 32 is normally cleared when the actual sync mark, or the pseudo sync mark generates the sync clock SY_CLK. During re-sync, when comparator 88 has initiated the re-sync, bit counter 32 is reset when detector 34 detects the true sync mark within the early or late window.

The bit count from bit counter 32 is compared by comparators 82, 84 to the beginning of the early window and the end of the late window. The early window is 32 bits wide, and begins after the last of the 1456 channel bits, so comparator 82 sets S-R latch 86 when the bit count from counter 32 reaches 1456. Setting S-R latch 86 begins the window, enabling the true sync from detector 34 through AND gate 45 to generate the sync reset $SY_{13}$ RST. The sync reset clears bit counter 32 when the true sync mark is detected, beginning the channel data demodulation for the data after the sync mark. Thus the sync is reset to the actual sync timing.

Comparator 84 compares the bit count from counter 32 to the end of the late window. Since the late window is the 16 bits after the sync mark, the count from the last sync mark is 1456 channel bits, plus the 32 sync-pattern bits, plus the 16-bit late window, a total of 1504 bits. When 1504 bit clocks have passed, the late window has elapsed and comparator 84 resets S-R latch 86, disabling the sync-detection windows. AND gate 45 blocks any sync marks detected outside the windows, preventing bit counter 32 from being reset. When no sync mark was found in either the early or late windows, the timing is hopelessly lost and bit counter 32 is set to 16, effectively inserting a pseudo-sync mark.

Figure 11:
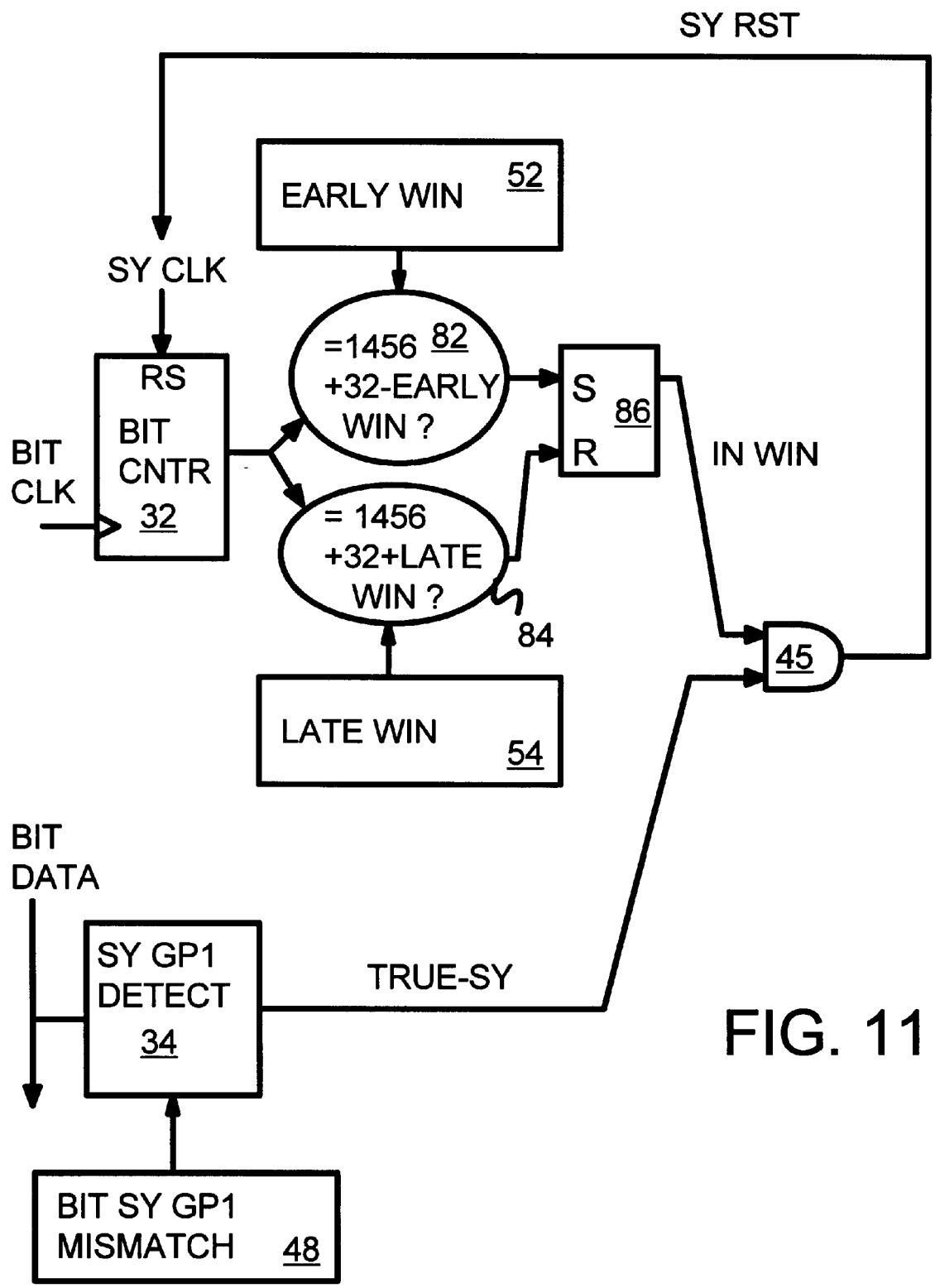
FIG. 11 shows a re-sync circuit using programmable-width early and late windows.

Programmable Early and Late Re-Sync Windows—FIG. 11

FIG. 11 shows a re-sync circuit using programmable-width early and late windows. When programmable early and late windows are used, comparators 82, 84 can be controlled by early and late window size registers 52, 54. Comparator 82 sets S-R latch 86 when the bit count from counter 32 reaches 1456+32–the early window size.

When the early window is 32 bits, detection begins at 1456 bits. When the early window is disabled (size=0), detection begins at 1456+32 bits, the nominal sync location. Detection can also begin at 1456+16 and 1456+24 for 16 and 8 bit early window sizes.

Comparator 84 clears S-R latch 86 when the bit count from counter 32 reaches 1456+32+the late window size. When the late window is 16 bits, detection begins at 1456+32+16, or 1504 bits. When the late window is disabled (size=0), detection begins at 1456+32 bits, the nominal sync location. Detection can also begin at 1456+32 +8 for the 8-bit late window size.

S-R latch 86 can include circuitry to remain reset when both comparators 82, 84 signal at the same time, when both early and late windows are disabled (zero width). S-R latch 86 should not toggle under the simultaneous S-R condition as some simpler set-reset latches do.

ADVANTAGES OF THE INVENTION

A sync detector for DVD detects the start of a physical sector when errors are present in the sync marks. An error-tolerant sync detector is thus disclosed. The sync timing is adjusted for jitter that occurs as the data is read from the disk. A sync jitter-adjuster interfaces smoothly with the demodulator.

The SY0 sync mark at the beginning of the physical sector is detected, regardless of high-speed read errors that may wipe out even the SY0 mark itself. The inventor uses programmability added to sync detection to improve reliability while allowing for read errors. With the invention, entire sync marks can be missed if the rest of a programmable sequence is found, allowing for reliable sync detection. Bit errors in the sync marks can be tolerated by matching several sync marks in sequence during initial sync detection, and by using a window for re-sync to screen out channel data.

Programmable windows are used for detection the sync mark once initial detection has been made. Errors outside the windows that appear to be sync marks are screened out. The width of the programmable windows is preferably a multiple of the modulation width for easy interfacing with the demodulator.

Data extraction to the demodulator begins immediately since the next frame's codewords follow the sync mark. A re-sync occurs without disruption to the data extraction and demodulation process. Thus re-sync is carried out on-the-fly without disruption of data transfer, improving performance.

ALTERNATE EMBODIMENTS

Several other embodiments are contemplated by the inventors. For example, other circuit implementations are possible. Often the logic is merely described using a written language such as a hardware-design language (HDL) that instructs a logic-synthesis software tool to actually implement the logic in gates and transistors. Programmable register can be combined together, or multiple registers used. Registers may be programmed by firmware routines on a microcontroller, or by the host processor.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An error-tolerant sync-sequence detector comprising:
    a bit-stream input from an optical disk;
    sync-code detector, coupled to the bit-stream input, for detecting a variable syn code and decoding a sync number from the variable sync code, the sync number varying for different sync codes within a physical sector of the optical disk;
    fixed-pattern detector, coupled to the bit-stream input, for detecting a fixed sync pattern, the fixed sync pattern being a same pattern of bits for all sync marks in the physical sector; and
    a sync-code sequencer, coupled to receive the sync number from the sync-code detector when the fixed-pattern detector detects the fixed sync pattern, the sync-code sequencer comparing a sequence of sync numbers received from the sync-code detector to a predetermined sequence of sync-code numbers, the sync-code sequencer signaling an initial sync when the sequence of sync numbers received matches the predetermined sequence of sync code numbers,
    whereby the initial sync is generated by matching the predetermined sequence of sync-code numbers, the variable sync codes varying for different sync codes within the physical sector.

2. The error-tolerant sync-sequence detector of claim 1 further comprising:
    a sync-code sequence register, coupled to the sync-code sequencer, for storing an identifier to indicate the predetermined sequence of sync-code numbers,
    wherein the predetermined sequence of sync-code numbers matched by the sync-code sequencer is programmable.

3. The error-tolerant sync-sequence detector of claim 2 further comprising:
    a sync-code threshold register, coupled to the sync-code sequencer, for storing a threshold number of mismatched sync codes allowed,
    wherein the sync-code sequencer generates the initial sync when the sequence of sync-numbers received matches the predetermined sequence of sync-code numbers except for an allowed number of sync-code numbers with errors in the sequence of sync numbers received when the allowed number does not exceed the threshold number,
    whereby a threshold number of sync codes with errors are allowed when the initial sync is generated.

4. The error-tolerant sync-sequence detector of claim 3 wherein each sync mark in the physical sector comprises:
    the variable sync code; and
    the fixed sync pattern,
        wherein the variable sync code is decoded to one of seven sync-code numbers while the fixed sync pattern is a fixed bit pattern for all sync marks in the physical sector,
    whereby each sync mark contains a variable and a fixed section.

5. The error-tolerant sync-sequence detector of claim 4 wherein a first sync mark in the physical sector has a variable sync code corresponding to a unique sync-code number while other sync marks in the physical sector have variable sync cods corresponding to sync-code numbers that are repeated within the physical sector,
    whereby only the first sync mark has a unique sync code.

6. The error-tolerant sync-sequence detector of claim 5 wherein the predetermined sequence of sync-code numbers ends with the unique sync-code number,
    whereby the initial sync is generated at the first sync mark of the physical sector.

7. The error-tolerant sync-sequence detector of claim 5 wherein the predetermined sequence of sync-code numbers is a sequence of different sync-code numbers interleaved with a same sync-code number between each pair of different sync-code numbers.

8. The error-tolerant sync-sequence detector of claim 2 further comprising:
    a fixed bit-error threshold register, coupled to the fixed-pattern detector, for indicating a threshold number of allowed bit errors in the fixed sync pattern that are masked,
    wherein bit errors in the fixed sync pattern are tolerated.

9. The error-tolerant sync-sequence detector of claim 8 further comprising:
    a bit-error threshold register, coupled to the sync-code detector, for indicating a threshold number of allowed bit errors in the variable sync code that are masked,
    wherein bit errors in the variable sync code are tolerated.

10. The error-tolerant sync-sequence detector of claim 8 further comprising:
    a sync clock generated by the fixed-pattern detector when the fixed sync pattern is detected;
    a bit counter, coupled to a bit clock extracted from a bit-stream from the optical disk, for counting a number of bits since a last sync mark, the bit counter reset by the sync clock; and
    a comparator, coupled to the bit counter, for outputting a pseudo-sync clock pulse to the sync clock after an expected number of bits since the last sync mark, the pseudo-sync clock pulse resetting the bit counter,
    whereby missing sync marks generate a pseudo sync.

11. The error-tolerant sync-sequence detector of claim 10 further comprising:
    a window detector, coupled to the bit counter, for signaling a window around an expected sync point at the expected number of bits since the last sync mark; and
    enabling means, coupled to the fixed-pattern detector, for enabling a reset of the bit counter when the fixed-pattern detector detects the fixed sync pattern within the window, but preventing the reset when the fixed sync pattern is detected outside the window, whereby the bit counter is reset to resynchronize to the fixed sync pattern when the fixed sync pattern is within the window.

12. The error-tolerant sync-sequence detector of claim 10 further comprising:
a pseudo-sync counter, coupled to the comparator, for counting a pseudo number of pseudo-sync clock pulses and outputting a sync error when the pseudo number exceeds a predetermined pseudo threshold, the pseudo-sync counter reset by the fixed-pattern detector when the fixed sync pattern is detected;
wherein a predetermined number of missed sync marks are allowed before the sync error is signaled.

13. The error-tolerant sync-sequence detector of claim 1 wherein the sync-code detector is coupled to the bit-stream input through the fixed-pattern detector.

14. The error-tolerant sync-sequence detector of claim 1 wherein the optical disk is a digital-versatile disk (DVD) optical disk.

15. The error-tolerant sync-sequence detector of claim 1 wherein each physical sector contains thirteen rows, each row containing two sync marks for synchronizing two channels of data bits in the row.

16. A sync adjuster comprising:
a bit-stream input from an optical disk;
fixed-pattern detector, coupled to the bit-stream input, for detecting a fixed sync pattern, the fixed sync pattern being a same pattern of bits for all sync marks in a physical sector on the optical disk;
a sync clock generated by the fixed-pattern detector when the fixed sync pattern is detected;
a bit counter, coupled to a bit clock extracted from a bit-stream from the optical disk, for counting a number of bits since a last sync mark, the bit counter reset by the sync clock;
a window detector, coupled to the bit counter, for signaling a window around an expected sync point at an expected number of bits since the last sync mark; and
enabling means, coupled to the fixed-pattern detector, for enabling a reset of the bit counter when the fixed-pattern detector detects the fixed sync pattern within the window, but preventing the reset when the fixed sync pattern is detected outside the window,
whereby the bit counter is reset to resynchronize to the fixed sync pattern when the fixed sync pattern is within the window.

17. The sync adjuster of claim 16 further comprising:
a bit-stream slicer, coupled to the bit-stream input, for generating codewords as 16-bit slices of bits from the bit-stream input;
a demodulator, coupled to the bit-stream slicer, for converting the codewords of 16-bits into symbols of 8 bits, the symbols for transfer to a host after error correction;
wherein the window comprises an early window before the expected number of bits and a late window after the expected number of bits;
wherein the early window is equal to a number of bit in a sync mark; and
wherein the late window is equal to a number of bits in a modulation codeword,
whereby windows are sized to match sync mark and codeword sizes.

18. A method of initially synchronizing a digital-versatile disk (DVD) controller to physical sectors on a DVD optical disk, the method comprising:
detecting a fixed sync pattern in a data stream read from the DVD optical disk, wherein the fixed sync pattern is a same pattern of bits in all sync marks on the DVD optical disk;
detecting a first variable sync code in a sync mark containing the fixed sync pattern;
waiting through channel bits in the data stream until a next sync mark is detected;
detecting the fixed sync pattern and a second variable sync code in the next sync mark;
repeating for a programmable number of times:
waiting through more channel bits in the data stream until a next sync mark is detected;
detecting the fixed sync pattern and other variable sync codes in the next sync mark; and
comparing a sequence of the first, second, and other variable sync codes to a programmed sequence of sync codes and generating an initial sync when the first, second, and other variable sync codes correspond to the programmed sequence of sync codes;
whereby the initial sync is generated by searching for the programmed sequence of sync codes.

19. The method of claim 18 further comprising:
ignoring a programmable number of the first, second, and other variable sync codes when determining when the initial sync is generated,
whereby the programmable number of sync codes with errors are tolerated.

20. The method of claim 19 further comprising:
once the initial sync is generated and jitter has altered synchronization:
detecting the fixed sync pattern with bit errors when not all bits match but at least a predetermined minimum number of bits in the fixed sync pattern match;
counting an expected number of bits since a last sync mark;
beginning a window a first predetermined number of bits before the expected number of bits;
ending the window a second predetermined number of bits after the expected number of bits; and
resetting a bit counter when the fixed sync pattern is detected within the window, but not resetting the bit counter when the fixed sync pattern is detected outside the window,
whereby sync is reset when the fixed sync pattern containing bit errors is detected within the window.

* * * * *